(12) United States Patent
Ebert et al.

(10) Patent No.: US 6,182,734 B1
(45) Date of Patent: Feb. 6, 2001

(54) APPARATUS FOR SEALING TUBULAR OR BAG-SHAPED PACKAGING CASINGS

(75) Inventors: Detlef Ebert, Bad Nauheim; Klaus Wissel, Alzenau, both of (DE)

(73) Assignee: Poly-Clip System GmbH & Co. KG, Frankfurt am Main (DE)

( * ) Notice: Under 35 U.S.C. 154(b), the term of this patent shall be extended for 0 days.

(21) Appl. No.: 09/196,970

(22) Filed: Nov. 20, 1998

(30) Foreign Application Priority Data

Nov. 30, 1997 (DE) ............................................. 197 53 000

(51) Int. Cl.[7] ....................................................... B65B 9/15
(52) U.S. Cl. ............................ 156/581; 156/515; 156/530
(58) Field of Search ................................... 156/580, 581, 156/250, 251, 510, 515, 530, 583.1

(56) References Cited

FOREIGN PATENT DOCUMENTS

| 2835973 | 2/1980 | (DE) | ............................... F16H/25/04 |
| 296 13 336 U | 10/1996 | (DE) | ............................... B65B/9/15 |
| 2294518 | 5/1996 | (GB) | ............................... F16H/25/12 |
| 60-44655 | 3/1985 | (JP) | ............................... F16H/21/44 |

*Primary Examiner*—James Sells
(74) *Attorney, Agent, or Firm*—Norris McLaughlin & Marcus P.A.

(57) ABSTRACT

The invention consists in an apparatus for sealing tubular or bag-shaped packing casings, comprising tools such as crimping shears for crimping the packaging casing as well as a punch (10) and a die (12) for setting and closing closure clips (46), where the movement of one or several tools is predetermined by at least one cam track on which a scanning roller (22; 32) is rolling, and which is characterized in that it additionally comprises a guide roller, which rolls on a separate guideway on the cam plate and by means of an elastic element (61) urges the scanning roller (32) against the cam track with a bias due to an elastic deformation of the elastic element (61).

6 Claims, 1 Drawing Sheet

APPARATUS FOR SEALING TUBULAR OR BAG-SHAPED PACKAGING CASINGS

Figure 1:
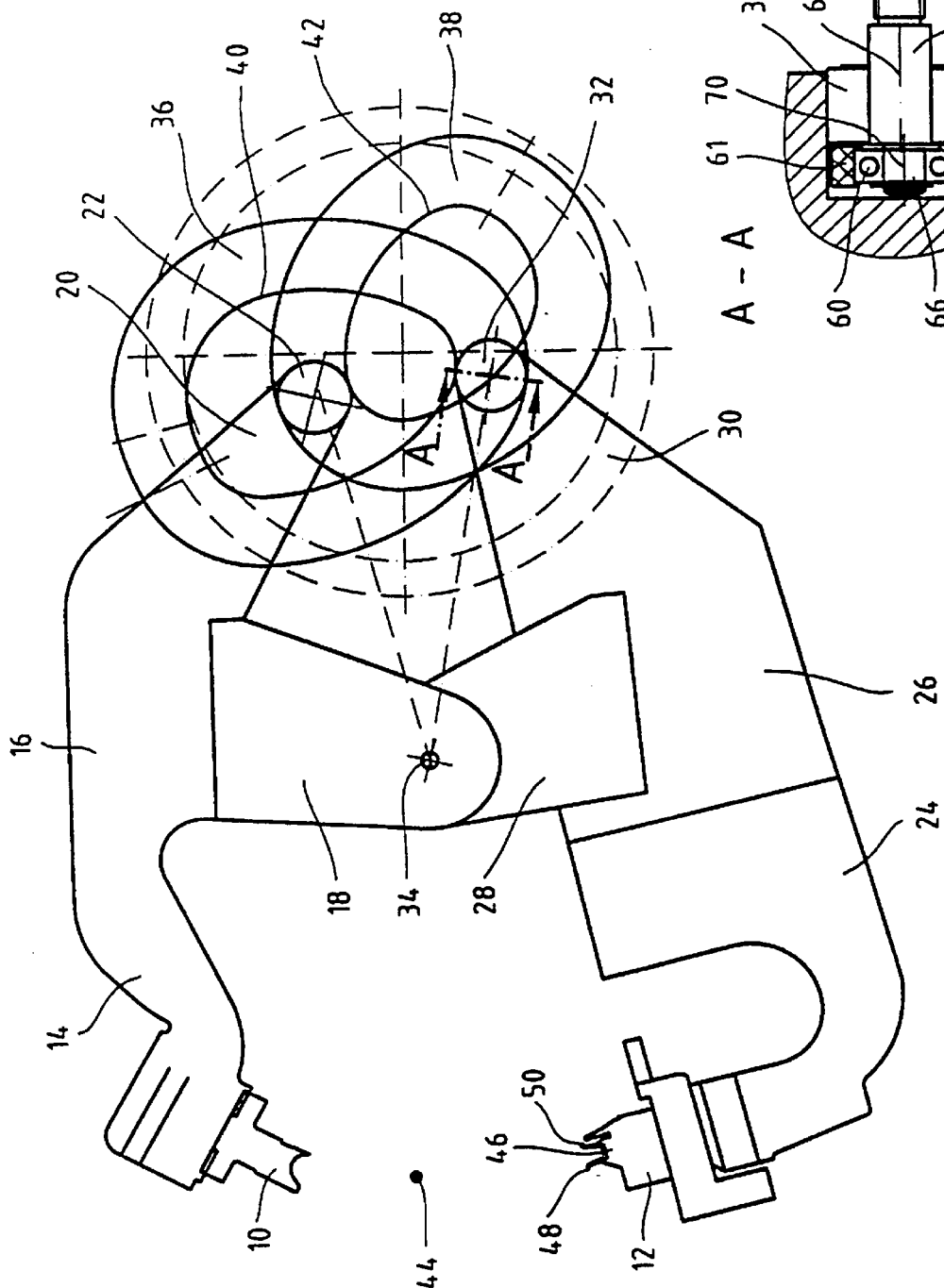

This invention relates to an apparatus for sealing tubular or bag-shaped packaging casings, comprising tools such as crimping shears for crimping the packaging casing as well as a punch and a die for setting and closing closure clips, where the movement of one or several tools is predetermined by at least one cam track on which a scanning roller is rolling.

In known apparatuses of this type a separate cam track is generally associated to each of said tools, i.e. to the two crimping shears as well as to the punch and the die, so that the movement of these tools is predetermined individually. One cam track each is provided on a cam plate and is for instance formed by the outer flank or the inner flank of the groove in this cam plate. A scanning roller engages in said groove, which scanning roller can roll on the inner or outer flank of the groove and via a lever mechanism is connected with the respective tool. When the cam plate is put into rotation, the scanning roller scans the cam track on the cam plate and drives the associated tool via the respective lever mechanism. The movement of the tool is predetermined by the shape of the cam track on the cam plate.

In general, the movement of the above-mentioned tools is such that a filled packaging casing is first of all crimped by two crimping shears, so that there is obtained a short packaging casing neck free of filling. This packaging casing neck is subsequently elongated by spreading the crimping shears, and thereupon sealed by setting and closing two closure clips. Setting and closing the closure clips is effected by means of a punch and a die, which upon producing and elongating the neck free of filling are moved towards each other in the manner of shears, taking the neck between each other. The first of all open U-shaped closure clips are moved towards the neck by the die and bent around the neck, as soon as from the other side the punch hits the free leg ends of the U-shaped closure clips. After the packaging casing has been sealed in this way, the crimping shears are opened again and punch and die are again moved away from each other back to their starting position. The entire cycle of movement of crimping shears as well as of punch and die is controlled by the cam tracks on the motor-driven cam plates.

When the scanning roller is guided in the groove of a cam plate, it rests temporarily against the inner groove flank and temporarily against the outer groove flank during the cycle of movement of one of the tools, and in the case of a change of flank undergoes a reversal of the direction of rotation. Since there is regularly desired a high number of cycles, i.e. the production of a rather large number of sealed packages per unit of time, the number of revolutions of the cam plates as well as the accelerations which the scanning roller undergoes, are relatively high. Moreover, the force required for closing the closure clips is likewise transmitted via the cam tracks into the corresponding cam plates for punch and die. The force peaks upon closing the closure clips as well as during the reversal of the movement of the tools, which is connected with corresponding accelerations, lead to a wear of the cam track.

To avoid such wear, the German Utility Model 296 13 336 U1 proposes to drive the tools by means of one double roller lever and one cam plate each, where each of the two rollers is rolling on only one associated flank of the cam plate. In this way, the wear-promoting change of the sense of rotation of the rollers should be avoided, which occurs when during the reversal of the movement of the tools a groove-guided scanning roller changes from the inner groove flank to the outer groove flank or vice versa.

Nevertheless, such an arrangement with two cam rollers is also exposed to a certain wear, for instance due to force peaks when accelerating the tools or when closing the closure clips. Moreover, between the two cam rollers and the cam tracks a clearance of 0.1 to 0.2 mm must be maintained, so that the arrangement will not jam, but can freely rotate. This clearance will even be increased by the wear caused by the force peaks. This means that the cam rollers for a short moment do not touch their associated cam track during the change of the direction of movement of the tools and come to a standstill, in order to be accelerated abruptly shortly thereafter. At this point of acceleration, an additional wear occurs.

The DE-AS 20 37 689 discloses a cam plate drive, whose cam plate is scanned on the outside by a scanning roller. The scanning roller is pressed onto the cam plate by a spring. In such an arrangement there is, however, the risk that the scanning roller is lifted off the cam plate at high rotational speeds, as the spring force is not sufficient to sufficiently accelerate the scanning roller together with the levers connected therewith, in order to follow the cam plate. However, what speaks against an increase of the spring force is the fact that the spring force must be overcome by the drive of the cam plate. Moreover, the spring force produces an additional wear at the cam plate and the scanning roller.

It is the object underlying the invention to provide a sealing apparatus with a tool drive rather free of wear, which eliminates the disadvantages of the prior art as far as possible.

This object is solved in accordance with the invention by an apparatus as described above, which in addition has a guide roller, which rolls on a separate guideway on the cam plate and by means of one elastic element each urges the scanning roller against the cam track with a bias due to an elastic deformation of the elastic element.

In such an arrangement, the scanning roller always rolls on a cam track. Thus, there is no reversal of the direction of rotation of the scanning roller. Since the scanning roller is always pressed onto the cam track, the scanning roller will not be lifted off the cam track, and the related wear will not occur. Finally, any wear will automatically be compensated by the elastic element.

What is preferred is an apparatus whose guide roller is stationarily arranged with respect to the scanning roller and has an elastically compressible running jacket, which constitutes the elastic element. The running jacket preferably consists of an elastic plastic material with a hardness of 60 to 90 Shore. In the last mentioned embodiment, the force required for moving or accelerating the tool is transmitted in a direction of movement of the tool from the cam track via the scanning roller to the tool, and in the opposite direction of movement of the tool is transmitted from the guideway via the guide roller to the tool. In the first mentioned embodiment, the force required for moving the tool is likewise transmitted in a direction of movement of the tool from the cam track via the scanning roller to the tool, but in the opposite direction of movement can also be applied exclusively by the elastic element, which presses the scanning roller onto the cam track. In any case, both the forward and the return movement of the tools are controlled by the respective cam track and scanning roller.

In an apparatus having at least one rotatable cam plate, into which at least one groove has been milled, whose groove flank forms the cam track, the opposite groove flank preferably forms the guideway,, and guide roller and scanning roller are preferably arranged on a common steering knuckle with rotational axes offset with respect to each other in parallel, so that the guide roller rolls on the guideway with a bias and presses the scanning roller onto the cam track. Such an apparatus can be realized easily and, depending on the depth of the groove, also by modifying already existing sealing machines, and it offers all the aforementioned advantages.

The offset of the rotational axis of the guide roller with respect to that of the scanning roller is preferably dimensioned such that the counter path presses in the running jacket of the guide roller by 0.5 to 1 mm, when the scanning roller rests on the cam track. A decisive aspect substantially is the offset of the two rotational axes in a radial direction with respect to the cam plate, as the groove flanks of the groove in the cam plate extend substantially tangentially, but at least never radially. Due to the corresponding offset of the rotational axes with respect to each other, it is ensured that the scanning and guide rollers always roll on their tracks under a bias, and a wear up to 0.5 mm is automatically compensated by the elastic running jacket of the guide roller without readjusting the offset.

The guide roller is preferably mounted on the steering knuckle by means of an eccentric. The direction in which the axes of rotation of the scanning roller and the guide roller are offset in parallel with respect to each other can preferably be adjusted by rotating the eccentric with respect to the steering knuckle. When the eccentric is for instance firmly connected with the steering knuckle as an eccentric nose of the steering knuckle, the adjustment can be effected by rotating the steering knuckle. In this way, the distance which the rotational axes of the scanning roller and the guide roller have from each other in radial direction with respect to the cam plate can easily be adjusted, so that the bias of guide roller and scanning roller can also be adjusted by simply rotating the eccentric.

Figure 2:
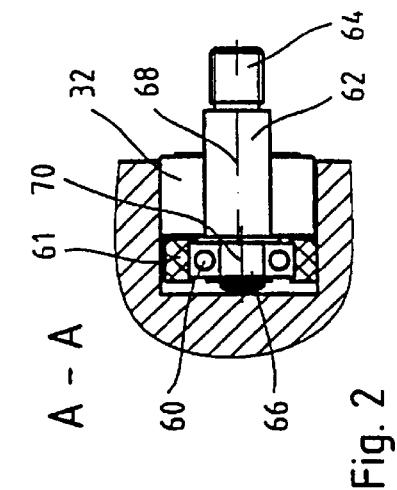

The invention will now be explained in detail with respect to an embodiment and the drawings, wherein:

FIG. 1 is a schematic representation of a side view of the drive of punch and die of a sealing machine; and FIG. 2 shows the arrangement of a scanning roller and a guide roller in the groove of a cam plate in the section A—A represented in FIG. 1.

FIG. 1 shows two tools of a sealing machine, namely the punch 10 and the die 12. The punch 10 is fixed at the front leg 14 of a three-legged upper lever 16. The upper lever 16 is pivoted at its middle leg 18, and at the free end of the rear leg 20 provided with an upper scanning roller 22.

The die 12 is fixed at the tool leg 24 of a three-legged lower lever 26. The lower lever 26 is pivoted at its middle bearing leg 28, and the free end of its third leg 30 has a lower scanning roller 32. The upper lever 16 and the lower lever 26 are both pivotally mounted on the same rotational axis 34.

The swivel movement of both levers 16 and 26 is initiated and controlled by a groove 36 and 38, respectively, in a cam plate not represented in detail. The inner flanks 40 and 42 of the groove constitute cam tracks for initiating and controlling the movement of the upper lever 16 and the lower lever 26, respectively. For this purpose, the upper scanning roller 22 and the lower scanning roller 32 engage in the associated groove 36 and 38, respectively, and roll on the inner flanks 40 and 42 thereof, as soon as the cam plate is put in rotation by a motor which is likewise not represented here.

Due to the shape of the cam tracks, the legs 20 and 30 of the upper lever 16 and of the lower lever 26, respectively, are pressed up or down proceeding from the position represented in FIG. 1, so that both levers 16 and 26 are swivelled about the rotational axis 34, with the result that the tools provided at the free ends of the legs 14 and 24, namely the punch 10 and the die 12, move towards each other in the manner of shears. From the top and from the bottom they approach a neck 44 of a packaging casing, which neck is going to be sealed with a closure clip 46. While the die 12 and the punch 10 approach the neck 44, the first of all open U-shaped closure clip 46 is held by the die 12. The punch 10 and the die 12 move towards the neck 44 such that two free legs 48 and 50 of the closure clip 46 take the neck 44 between each other. As soon as in the further course of the movement of punch 10 and die 12 the punch 10 touches the free ends of the legs 48 and 50 of the closure clip 46, it bends the same around the neck 44 and seals the neck in this way with the closure clip 46.

Upon closing the closure clip 46, the punch 10 and the die 12 reach a point of closest mutual approach, whereafter their movement is reversed. From then on, punch 10 and die 12 move away from each other and back to their starting position. In connection with this cycle of movement, the cam plate has also rotated once by 360°, and each of the scanning rollers 22 and 32 has once completely moved along the associated cam track.

In a cross-section through the groove 36 at the point designated with A—A in FIG. 1, FIG. 2 shows that not only the scanning roller 32 engages in the groove 36, but also a guide roller 60 which is provided with an elastic running jacket 61. Both the scannning roller 32 and the guide roller 60 are mounted together on a steering knuckle 62, which at its one end 64 is screwed to the free end of the guiding leg 30 of the lower lever 26 (not represented in FIG. 2). The scanning roller 32 is concentrically mounted on the steering knuckle 62, while the guide roller 60 is mounted on an eccentric bearing pin 66 of the steering knuckle 62, so that the rotational axes 68 and 70 of the scanning roller 32 and of the guide roller 60 are offset in parallel with respect to each other. This offset is dimensioned such that the guide roller 60 with its elastic running jacket 61 rolls on the outer groove flank of the groove 36 under a bias, thereby urging the scanning roller 32 against the inner groove flank of the groove 36. Due to the bias, the elastic running jacket 61 of the guide roller 60 has been pressed in laterally by 0.5 to 1 mm. This ensures that the bias also exists at those points of the groove 36 which are slightly widened due to wear.

The arrangement of scanning roller 32 and guide roller 60 shown in FIG. 2 ensures that the scanning roller 32 constantly rolls on the inner groove flank of the groove 36, while the guide roller 60 constantly rolls on the outer groove flank of the groove 36. The scanning roller 32 and the guide roller 60 rotate in opposite directions and maintain their sense of rotation during the entire cycle of movement. Wear is thus reduced. The direction of the offset of the two rotational axes 68 and 70 can be adjusted. This will also change the magnitude of the offset of the two axes of rotation in a radial direction with respect to the cam plate. As has already been explained above, this offset is decisive for the magnitude of the bias with which the guide roller 60 and the scanning roller 32 are urged against the associated groove flank. The bias can also be adjusted by adjusting the direction of the offset of the two rotational axes 68 and 70, i.e. by rotating the steering knuckle 62. The drive for the upper lever 16 is designed similar to the one represented in FIG. 2 for the lower lever 26.

What is claimed is:

1. An apparatus for sealing tubular or bag-shaped packaging casings, comprising tools such as crimping shears for crimping the packaging casing as well as a punch (10) and a die (12) for setting and closing closure clips (46), where the movement of one or several tools is predetermined by at least one cam track on which a scanning roller (22; 32) is rolling, wherein the apparatus additionally has a guide roller (60) stationarily mounted with respect to the scanning roller and having an elastically compressible running jacket (61). which rolls on a separate guideway on the cam plate and by means of said elastically compressible running jacket (61) urges the scanning roller (32) against the cam track with a bias due to an elastic deformation of said elastically compressible running jacket.

2. The apparatus as claimed in claim 1, wherein the running jacket (61) consists of an elastic plastic material with a hardness of 60 to 90 Shore.

3. The apparatus as claimed in claim 1 comprising at least one rotatable cam plate into which at least one groove (36; 38) has been cut, whose groove flank constitutes the cam track, wherein the groove flank opposite the cam track is the guideway, and that the guide roller (60) and the scanning roller (22; 32) with rotational axes (68, 70) offset in parallel with respect to each other are arranged on a common steering knuckle (62) such that the guide roller (60) rolls on the guideway under a bias, thereby pressing the scanning roller (22; 32) onto the cam track.

4. The apparatus as claimed in claim 3, wherein the offset of the rotational axis (70) of the guide roller (60) with respect to that of the scanning roller in a radial direction with respect to the cam plate is dimensioned such that the guideway presses in the running jacket (61) of the guide roller (60) by 0.5 to 1 mm, when the scanning roller (32) rests on the cam track.

5. The apparatus as claimed in claim 3, wherein the guide roller (60) is mounted on the steering knuckle (62) by means of an eccentric (66).

6. The apparatus as claimed in claim 5, wherein the direction in which the rotational axes (68, 70) of the scanning roller (32) and the guide roller (60) are offset in parallel with respect to each other can be adjusted by rotating the eccentric with respect to the steering knuckle.

* * * * *